United States Patent
Li et al.

(10) Patent No.: US 12,452,897 B2
(45) Date of Patent: Oct. 21, 2025

(54) ANTENNA DETERMINATION METHOD AND APPARATUS, TERMINAL, ELECTRONIC DEVICE, AND STORAGE MEDIUM

(71) Applicant: ZTE CORPORATION, Shenzhen (CN)

(72) Inventors: Jun Li, Shenzhen (CN); Jiaojiao Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 414 days.

(21) Appl. No.: 17/997,859

(22) PCT Filed: Jun. 16, 2021

(86) PCT No.: PCT/CN2021/100405
§ 371 (c)(1),
(2) Date: Nov. 3, 2022

(87) PCT Pub. No.: WO2022/001667
PCT Pub. Date: Jan. 6, 2022

(65) Prior Publication Data
US 2023/0224946 A1     Jul. 13, 2023

(30) Foreign Application Priority Data
Jun. 28, 2020   (CN) .......................... 202010600466.0

(51) Int. Cl.
*H04W 72/542*     (2023.01)
*H04B 7/08*     (2006.01)
(Continued)

(52) U.S. Cl.
CPC ........ *H04W 72/542* (2023.01); *H04B 7/0814* (2013.01); *H04W 72/02* (2013.01); *H04W 72/046* (2013.01)

(58) Field of Classification Search
CPC . H04W 72/542; H04W 72/02; H04W 72/046; H04W 4/44; H04W 4/46;
(Continued)

(56) References Cited

U.S. PATENT DOCUMENTS

| 6,330,433 B1 | 12/2001 | Jager |
| 2005/0239510 A1 | 10/2005 | Cho et al. |

(Continued)

FOREIGN PATENT DOCUMENTS

| CN | 106952480 A | 7/2017 |
| CN | 107454997 A | 12/2017 |

(Continued)

OTHER PUBLICATIONS

European Patent Office. Extended European Search Report for EP Application No. 21834426.5, mailed Aug. 21, 2023, pp. 1-7.
(Continued)

*Primary Examiner* — Hirdepal Singh
(74) *Attorney, Agent, or Firm* — Vivacqua Crane, PLLC

(57) ABSTRACT

An antenna determination method, apparatus, a terminal device, an electronic device, and a storage medium are disclosed. In the embodiments of the present disclosure, on the premise of establishing communication connection with an opposite terminal device, quality of received signals of at least two antennas are compared, a channel corresponding to
(Continued)

the signal with better signal quality is selected as a communication channel, and an antenna corresponding to the communication channel is determined for subsequent signal transmission and reception.

12 Claims, 5 Drawing Sheets

(51) Int. Cl.
*H04W 72/02* (2009.01)
*H04W 72/044* (2023.01)

(58) Field of Classification Search
CPC ..... H04W 72/40; H04W 76/14; H04W 92/18; H04B 7/0814; H04B 7/0608
USPC ..................................................... 455/452.1
See application file for complete search history.

(56) References Cited

U.S. PATENT DOCUMENTS

| | | | |
|---|---|---|---|
| 2014/0010335 A1 | 1/2014 | Lee et al. | |
| 2014/0024320 A1 | 1/2014 | Choi et al. | |
| 2014/0274182 A1* | 9/2014 | Menzel | H04B 7/04 |
| | | | 455/509 |
| 2020/0136265 A1 | 4/2020 | Kim | |
| 2020/0412425 A1* | 12/2020 | Laghate | H04B 7/0617 |
| 2021/0226330 A1* | 7/2021 | Zhou | H01Q 1/523 |
| 2022/0407574 A1* | 12/2022 | Goto | H04B 7/0691 |
| 2023/0089409 A1* | 3/2023 | Woo | H01Q 9/0407 |
| | | | 455/73 |
| 2023/0155742 A1* | 5/2023 | Nilsson | H04B 7/0608 |
| | | | 714/726 |

FOREIGN PATENT DOCUMENTS

| | | |
|---|---|---|
| CN | 109273845 A | 1/2019 |
| CN | 110197944 A | 9/2019 |
| CN | 110557182 A | 12/2019 |
| CN | 111245482 A | 6/2020 |

OTHER PUBLICATIONS

International Searching Authority. International Search Report and Written Opinion for PCT Application No. PCT/CN2021/100405 and English translation, mailed Aug. 16, 2021, pp. 1-9.

The State Intellectual Property Office of People's Republic of China. First Office Action and Search Report for CN Application No. 202010600466.0 and English translation, mailed Jun. 19, 2025, pp. 1-20.

* cited by examiner

# ANTENNA DETERMINATION METHOD AND APPARATUS, TERMINAL, ELECTRONIC DEVICE, AND STORAGE MEDIUM

CROSS-REFERENCE TO RELATED APPLICATION

This application is a national stage filing under 35 U.S.C. § 371 of international application number PCT/CN2021/100405, filed Jun. 16, 2021, which claims priority to Chinese patent application No. 202010600466.0 filed Jun. 28, 2020. The contents of these applications are incorporated herein by reference in their entirety.

TECHNICAL FIELD

The embodiments of the present disclosure relate to, but not limited to, the field of communication, and in particular to an antenna determination method and apparatus, a terminal device, an electronic device and a storage medium.

BACKGROUND

Vehicle-to-Everything Communications (V2X for short) refers to providing vehicle information through sensors, vehicle terminal devices and electronic tags provided on vehicles, and using various communication technologies to achieve Vehicle-to-Vehicle Communication (V2V for short), Vehicle-to-Pedestrian Communications (V2P for short), Vehicle-to-Infrastructure Communications (V2I for short), Vehicle-to-Network Communications (V2N for short), and effectively using such as extracting, sharing, etc., information on the information network platform to effectively control vehicles and provide comprehensive services.

Currently, there are two modes to allocate V2X resources: one mode is scheduling resources by an evolved Node B (eNB), and the other mode is selecting resources by User Equipment (UE) independently. The V2X direct link communication based on the mode of selecting resources by UE independently does not need to occupy the resources of the eNB, but the communication latency and communication quality still cannot meet the requirements. Therefore, it is urgent to achieve a communication mode with lower latency and higher reliability to reduce resource congestion and conflict.

SUMMARY

The following is a summary of the subjects detailed herein. This summary is not intended to limit the scope of protection of the claims.

According to some embodiments of the present disclosure, an antenna determination method and apparatus, a terminal device, an electronic device and a storage medium are provided.

In accordance with an aspect of the present disclosure, an embodiment provides an antenna determination method, which is applicable to a terminal device. The terminal device at least includes two antennas. The method may include: acquiring received signals of the two antennas; comparing signal quality of the received signals of the two antennas with a first signal quality threshold respectively, and selecting a channel corresponding to the received signal with signal quality greater than the first signal quality threshold as a communication channel; and determining an antenna corresponding to the communication channel as an operating antenna of the terminal device.

In accordance with another aspect of the present disclosure, an embodiment provides an antenna determination apparatus. The apparatus may include: a signal reception module configured to acquire received signals of two antennas; a channel selection module configured to compare signal quality of the received signals with a first signal quality threshold respectively, and select a channel corresponding to the received signal with signal quality greater than the first signal quality threshold as a communication channel; and an antenna determination module configured to determine an antenna corresponding to the communication channel.

In accordance with another aspect of the present disclosure, an embodiment provides a terminal device. The terminal device is configured to perform the antenna determination method described above.

In accordance with another aspect of the present disclosure, an embodiment provides an electronic device. The electronic device may include: a memory, configured to store a computer program which is able to implement the method described above, and a processor which, when executing the computer program, implements the method described above.

In accordance with another aspect of the present disclosure, an embodiment provides a computer-readable storage medium, storing computer executable instructions for performing the method described above.

Other features and advantages of the present disclosure will be set forth in the subsequent description, and will become apparent in part from the description, or will be understood by implementing the present disclosure. The object and other advantages of the present disclosure can be realized and obtained by the structures specially pointed out in the description, the claims and the drawings.

DETAILED DESCRIPTION

Figure 1:
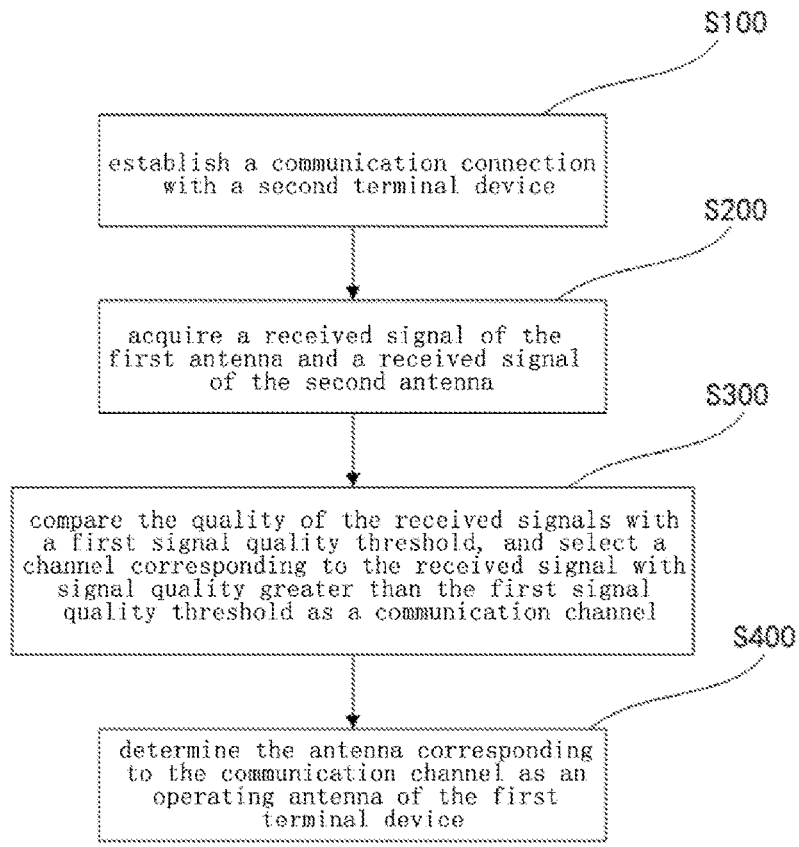
FIG. 1 is a flowchart of an antenna determination method according to an embodiment of the present disclosure.

In order to make the purpose, technical scheme and advantages of the present disclosure clear, the present disclosure is further described in detail below in combination with the drawings and embodiments. It should be understood that the specific embodiments described herein are only used to illustrate the present disclosure, and are not intended to limit the present disclosure.

It is to be noted, although functional modules have been divided in the schematic diagrams of devices and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish between similar objects, and are not necessarily used to describe a specific sequence or a precedence order.

In the description of the embodiments of the present disclosure, unless otherwise specified, the words such as setting, installation, connection, and the like should be understood in a broad sense, and those having ordinary skills in the art can reasonably determine the specific meaning of the above terms in the embodiments of the present disclosure in combination with the specific content of the technical scheme.

Currently, there are two modes to allocate V2X resources: one mode is scheduling resources by an evolved Node B (eNB), and the other mode is selecting resources by User Equipment (UE) independently. The V2X direct link communication based on the mode of selecting resources by UE independently does not need to occupy resources of the eNB, but the communication latency and communication quality still cannot meet the requirements. Therefore, it is urgent to achieve a communication mode with lower latency and higher reliability to reduce resource congestion and conflict.

In view of the above, according to some embodiments of the present disclosure, an antenna determination method and apparatus, a vehicle networking terminal device, an electronic device and a storage medium are provided. The antenna determination method and device, the vehicle networking terminal device, the electronic device and the storage medium, on the premise of establishing communication connection with an opposite terminal device, by means of comparing the quality of received signals of at least two antennas, selecting a channel corresponding to the signal with better signal quality as a communication channel, and switching to the antenna corresponding to the communication channel for subsequent signal transmission and reception, can effectively reduce the communication latency, improve the communication quality, and share obtained vehicle speed, direction, geographic location, route and other important information with other terminal devices in the vehicle network in a timely and effective manner in the V2X direct link communication based on the mode of selecting resources by UE independently.

The embodiments of the present disclosure are further described below in combination with the accompanying drawings.

In accordance with an aspect of the present disclosure, an embodiment provides an antenna determination method. FIG. 1 is a flowchart of the antenna determination method according to an embodiment of the present disclosure. As shown in FIG. 1, the antenna determination method according to this embodiment at least includes steps S100 to S400.

At S100, a communication connection is established with a second terminal device.

The antenna determination method in this embodiment is applicable to a first terminal device. Therefore, in this step, the first terminal device first establishes a communication connection with the second terminal device. The method for establishing communication connection may include: sending, by the first terminal device, connection information to the second terminal device through an antenna, and using, by the second terminal device, one or more antennas to receive data and realize communication connection with the first terminal device; or, sending, by the second terminal device, connection information to the first terminal device through an antenna and using, by the first terminal device, one or more antennas to receive data and realize communication connection with the second terminal device.

At S200, received signal of the first antenna and received signal of the second antenna are acquired.

It is worth noting that the first terminal device has at least two antennas, that is, the first terminal device may have three antennas, four antennas or even more. These antennas are preferably oriented in different directions, so as to be more accurate and sensitive to signals transmitted in different directions. As those having ordinary skills in the art know, these antennas may be directional antennas or antenna arrays. In combination with the beamforming technology of directional antennas, these antennas oriented in different directions can achieve low latency and high quality of communication.

After the communication connection is established, the second terminal device transmits through its antenna a reference signal to the first terminal device, and the reference signal is used for subsequent evaluation of channel quality.

In an embodiment, the second terminal device has four antennas, so that the second terminal device sends reference signals to the first terminal device through the four antennas.

In some examples, the second terminal device transmits reference signals through four antennas in a determined time period, and the four antennas transmit signals at intervals. Transmitting signals through different antennas at different times can avoid mutual interference between antenna signals, allowing subsequent evaluation of channel quality to be more accurate.

The first terminal device receives the reference signals transmitted by the second terminal device through more than two antennas, that is, for the first terminal device, the first terminal device acquires the received signal of the first antenna and the received signal of the second antenna. Here, the received signals are the reference signals.

In an embodiment, corresponding to the second terminal device with four antennas, the first terminal device also has four antennas, and the four antennas of the first terminal device respectively receive reference signals from the four antennas of the second terminal device.

At S300, the quality of the received signals are compared with a first signal quality threshold, and a channel corresponding to the received signal with signal quality greater than the first signal quality threshold is selected as a communication channel.

The first terminal device has at least a first antenna and a second antenna, so that at least two channels of received signals may be obtained, and then the signal quality of each received signal is calculated separately, where the signal quality of the received signal may have an evaluation parameter including a reference signal reception power, a signal to interference plus noise ratio, a received signal strength indication, a reference signal reception quality, and so on. Those having ordinary skills in the art should know that the signal quality can be evaluated through multiple dimensions and methods. Therefore, any parameters and methods that can be used to evaluate the signal quality are within the protection scope of S300 of the embodiment of the present disclosure.

In an embodiment, the reference signal reception power is used as an evaluation index of signal quality, that is, the higher the reference signal reception power of the received signal is, the higher the signal quality is.

By presetting a first signal quality threshold in advance, the signal with required signal quality and a corresponding channel are selected.

In an embodiment, once the signal quality is greater than the first signal quality threshold, the channel corresponding to the signal can be used as a transmission channel, where there may be one or more transmission channels.

In another embodiment, the channel corresponding to the signal with the best signal quality is selected as the transmission channel.

At S400, the antenna corresponding to the communication channel is determined as an operating antenna of the terminal device.

After determining the communication channel, the first terminal device selects the antenna corresponding to the communication channel as an antenna for subsequent transmission and reception, that is, the first terminal device will switch to the antenna corresponding to the communication channel.

Through the embodiments of the present disclosure, those having ordinary skills in the art should know that the first terminal device using the antenna determination method should have at least two antennas, while the second terminal device sending reference signals to the first terminal device may have one or more antennas. Meanwhile, there may be one or more transmission antennas obtained by the antenna determination method, as the terminal device may use multiple antennas to transmit at the same time in the actual operating state.

The antenna determination method according to the present embodiment, on the premise of establishing communication connection with an opposite terminal device, by means of comparing the quality of the received signals of at least two antennas, selecting the channel corresponding to the signal with better signal quality as the communication channel, and switching to the antenna corresponding to the communication channel for subsequent signal transmission and reception, can effectively reduce the communication latency, improve the communication quality, and share obtained vehicle speed, direction, geographic location, route and other important information with other terminal devices in a timely and effective manner in the V2X direct link communication based on the mode of selecting resources by UE independently.

Figure 2:
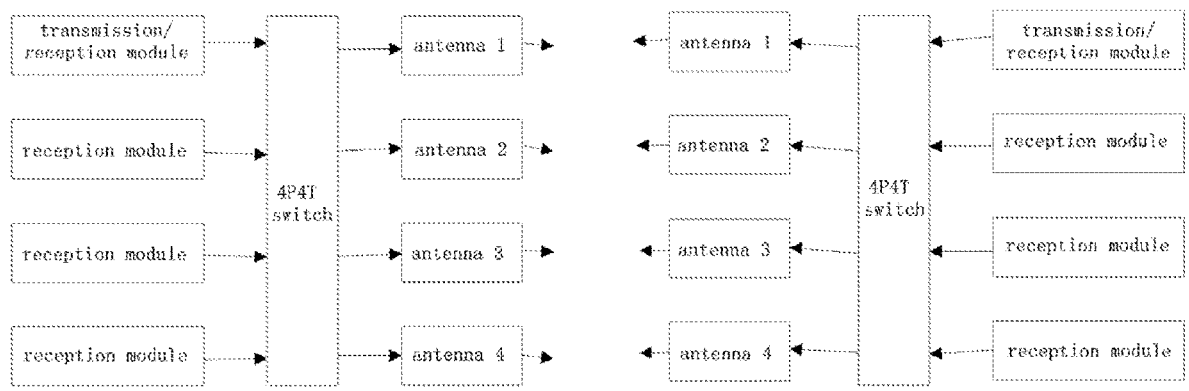
FIG. 2 is a schematic diagram of a terminal system according to an embodiment of the present disclosure.

FIG. 2 is a schematic diagram of a terminal system according to an embodiment of the present disclosure.

As shown in FIG. 2, the terminal system includes a first terminal device shown on the left and a second terminal device shown on the right. The first terminal device has a transmission/reception module that can support both transmission and reception, and three reception modules. The four modules are connected to four antennas through a 4P4T multi-pole multi-throw RF switch. The second terminal device also has a transmission/reception module that can support both transmission and reception, and three reception modules. The four modules are connected to four antennas through a 4P4T multi-pole multi-throw RF switch.

Figure 3:
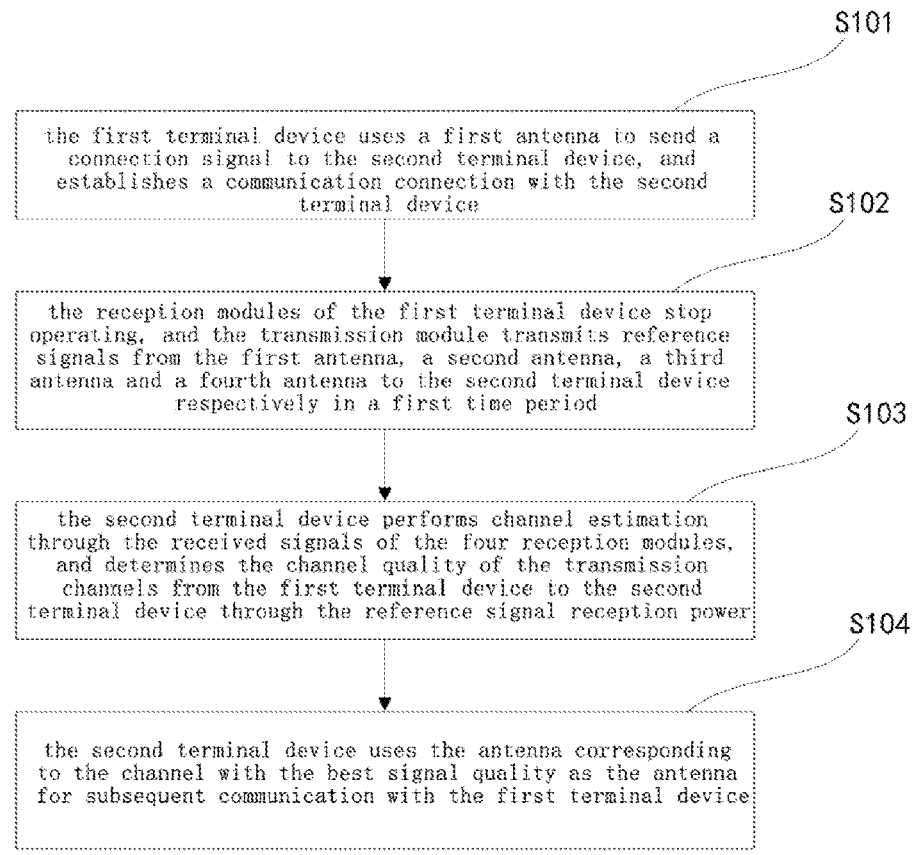
FIG. 3 is a flowchart of an antenna determination method based on a terminal system according to an embodiment of the present disclosure.

The flowchart of an antenna determination method of the terminal system according to this embodiment is shown in FIG. 3, which includes at least the following steps S101 to S104.

At S101, the first terminal device uses a first antenna to send a connection signal to the second terminal device, and establishes a communication connection with the second terminal device.

In this embodiment, the first terminal device sends connection information to the second terminal device through an antenna, and the second terminal device uses one or more antennas to receive data and realize communication connection with the first terminal device.

At S102, the reception modules of the first terminal device stop operating, and the transmission module transmits reference signals from the first antenna, a second antenna, a third antenna and a fourth antenna to the second terminal device respectively in a first time period.

In this embodiment, the first terminal device has four antennas, so the first terminal device transmits reference signals to the second terminal device periodically through the four antennas respectively, that is, transmits reference signals to the second terminal device from the first antenna, the second antenna, the third antenna and the fourth antenna respectively within a determined time period.

In this embodiment, corresponding to the first terminal device with four antennas, the second terminal device also has four antennas, and the four antennas of the second terminal device respectively receive reference signals from the four antennas of the second terminal device.

At S103, the second terminal device performs channel estimation through the received signals of the four reception modules, and determines the channel quality of the transmission channels from the first terminal device to the second terminal device through the reference signal reception power.

In this embodiment, the reference signal reception power is used as an evaluation index of signal quality, that is, the higher the reference signal reception power of the received signal is, the higher the signal quality is.

At S104, the second terminal device uses the antenna corresponding to the channel with the best signal quality as the antenna for subsequent communication with the first terminal device.

In this embodiment, based on the calculation of the reference signal reception power of each received signal, the channel corresponding to the received signal with the maximum reference signal reception power is used as the communication channel, and the second terminal device uses the antenna corresponding to the communication channel as an operating antenna.

Through the above steps, the second terminal device has switched to the antenna that can communicate with the first terminal device and has good channel quality. Prior to the next execution of the antenna switching scheme, the second terminal device will use this antenna to communicate with the first terminal device.

Correspondingly, in order to switch to an antenna that can communicate with the second terminal device and has good channel quality, the first terminal device also repeats the above steps S101 to S104.

The terminal system according to the present embodiment, on the premise of establishing communication connection with an opposite terminal device, by means of comparing the quality of the received signals of at least two antennas, selecting the channel corresponding to the signal with better signal quality as the communication channel, and switching to the antenna corresponding to the communication channel for subsequent signal transmission and reception, can effectively reduce the communication latency, improve the communication quality, and share obtained vehicle speed, direction, geographic location, route and other important information with other terminal devices in a timely and effective manner in the V2X direct link communication based on the mode of selecting resources by UE independently.

Figure 4:
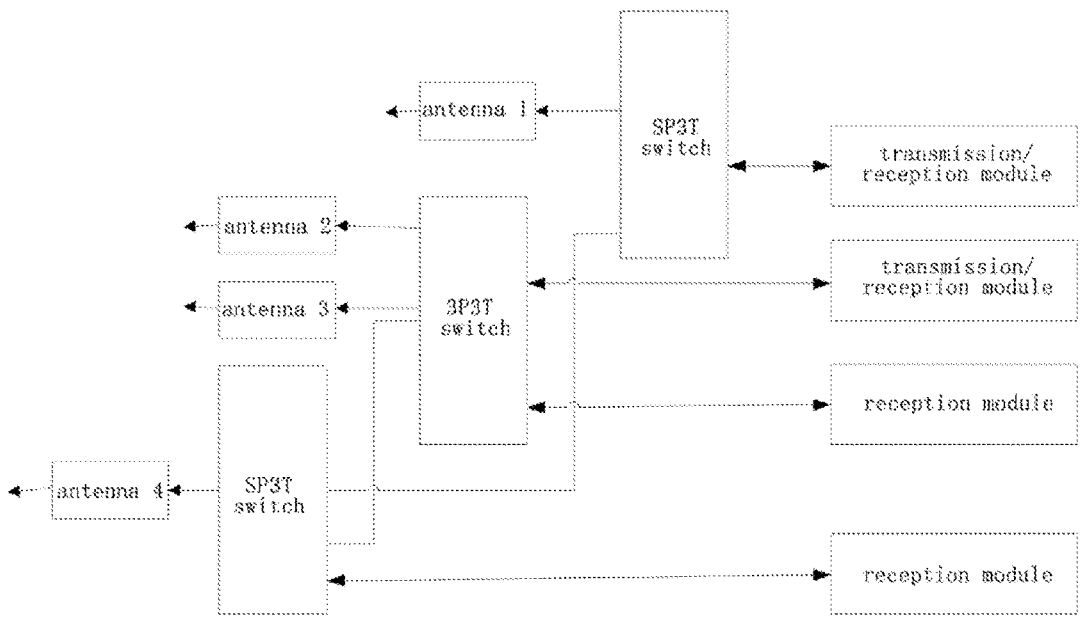
FIG. 4 is a schematic diagram of a V2X terminal device according to another embodiment of the present disclosure.

FIG. 4 is a schematic diagram of a V2X terminal device according to another embodiment of the present disclosure. FIG. 4 shows one V2X terminal device, which is a vehicle terminal device. The vehicle terminal device includes two transmission/reception modules that can support both transmission and reception, which are a first transmission/reception module and a second transmission/reception module, and two reception modules. As the reception and transmission of signals between the above transmission/reception modules will interfere with each other, the two transmission/reception modules are connected to different switches. A first antenna is connected to a first switch, a second antenna and a third antenna are respectively connected to a second switch, and a fourth antenna is connected to a third switch. The three switches are single-pole three-throw switches or three-pole three-throw switches, which are used to select an antenna and a corresponding module that meet the requirements.

Figure 5:
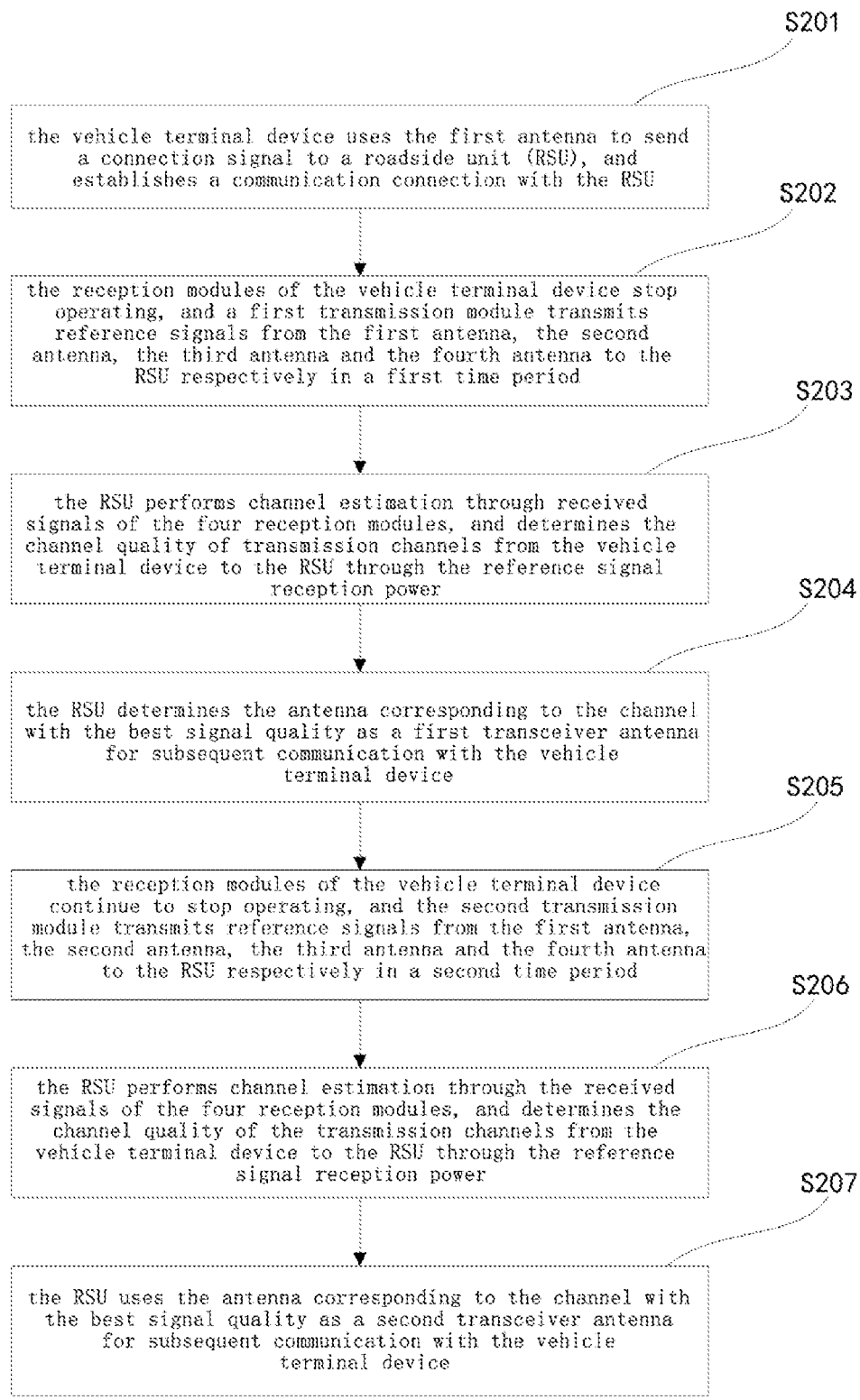
FIG. 5 is a flowchart of an antenna determination method based on a V2X terminal device according to another embodiment of the present disclosure.

The flowchart of an antenna determination method of the V2X terminal device according to this embodiment is shown in FIG. 5, which at least includes the following steps S201 to S207.

At S201, the vehicle terminal device uses the first antenna to send a connection signal to a roadside unit (RSU), and establishes a communication connection with the RSU.

At S202, the reception modules of the vehicle terminal device stop operating, and a first transmission module transmits reference signals from the first antenna, the second antenna, the third antenna and the fourth antenna to the RSU respectively in a first time period.

At S203, the RSU performs channel estimation through received signals of the four reception modules, and determines channel quality of transmission channels from the vehicle terminal device to the RSU through reference signal reception power.

At S204, the RSU determines the antenna corresponding to the channel with the best signal quality as a first transceiver antenna for subsequent communication with the vehicle terminal device.

At S205, the reception modules of the vehicle terminal device continue to stop operating, and the second transmission module transmits reference signals from the first antenna, the second antenna, the third antenna and the fourth antenna to the RSU respectively in a second time period.

At S206, the RSU performs channel estimation through the received signals of the four reception modules, and determines the channel quality of the transmission channels from the vehicle terminal device to the RSU through the reference signal reception power.

At S207, the RSU uses the antenna corresponding to the channel with the best signal quality as a second transceiver antenna for subsequent communication with the vehicle terminal device.

The above steps S201 to S204 are the transmission process of the reference signals of the vehicle terminal device based on the first transmission module, and the RSU on the opposite side determines the best antenna, i.e., the first transceiver antenna, that can communicate with the antenna supported by the first transmission module of the vehicle terminal device, by receiving, calculating and comparing the above reference signals using at least two antennas.

Steps S205 to S207 are basically the same as steps S202 to S204. The only difference lies in that the above steps are the transmission process of the reference signals of the vehicle terminal device based on the second transmission module, and the RSU on the opposite side determines the best antenna i.e., the second transceiver antenna, that can communicate with the antenna supported by the second transmission module of the vehicle terminal device, by receiving, calculating and comparing the above reference signals using at least two antennas.

As those having ordinary skills in the art know, vehicle terminal devices, roadside units, mobile phones and other fixed or mobile terminal devices in V2V, V2N, V2P and V2I systems can all use the antenna determination method according to the above embodiments, and be adaptively configured with terminal structures adapted to the above antenna determination method.

Meanwhile, the terminal device based on the Internet of Vehicles is always moving. Therefore, when the terminal device detects that the quality of the received signals has significantly decreased or is less than a preset second signal quality threshold, the antenna determination method will be re-executed to use the antenna corresponding to the channel with the best quality for real-time transmission and reception.

The terminal system according to the present embodiment, on the premise of establishing communication connection with an opposite terminal device, by means of comparing the quality of the received signals of at least two antennas, selecting the channel corresponding to the signal with better signal quality as the communication channel, and switching to the antenna corresponding to the communication channel for subsequent signal transmission and reception, can effectively reduce the communication latency, improve the communication quality, and share obtained vehicle speed, direction, geographic location, route and other important information with other terminal devices in the vehicle network in a timely and effective manner in the V2X direct link communication based on the mode of selecting resources by UE independently.

Figure 6:
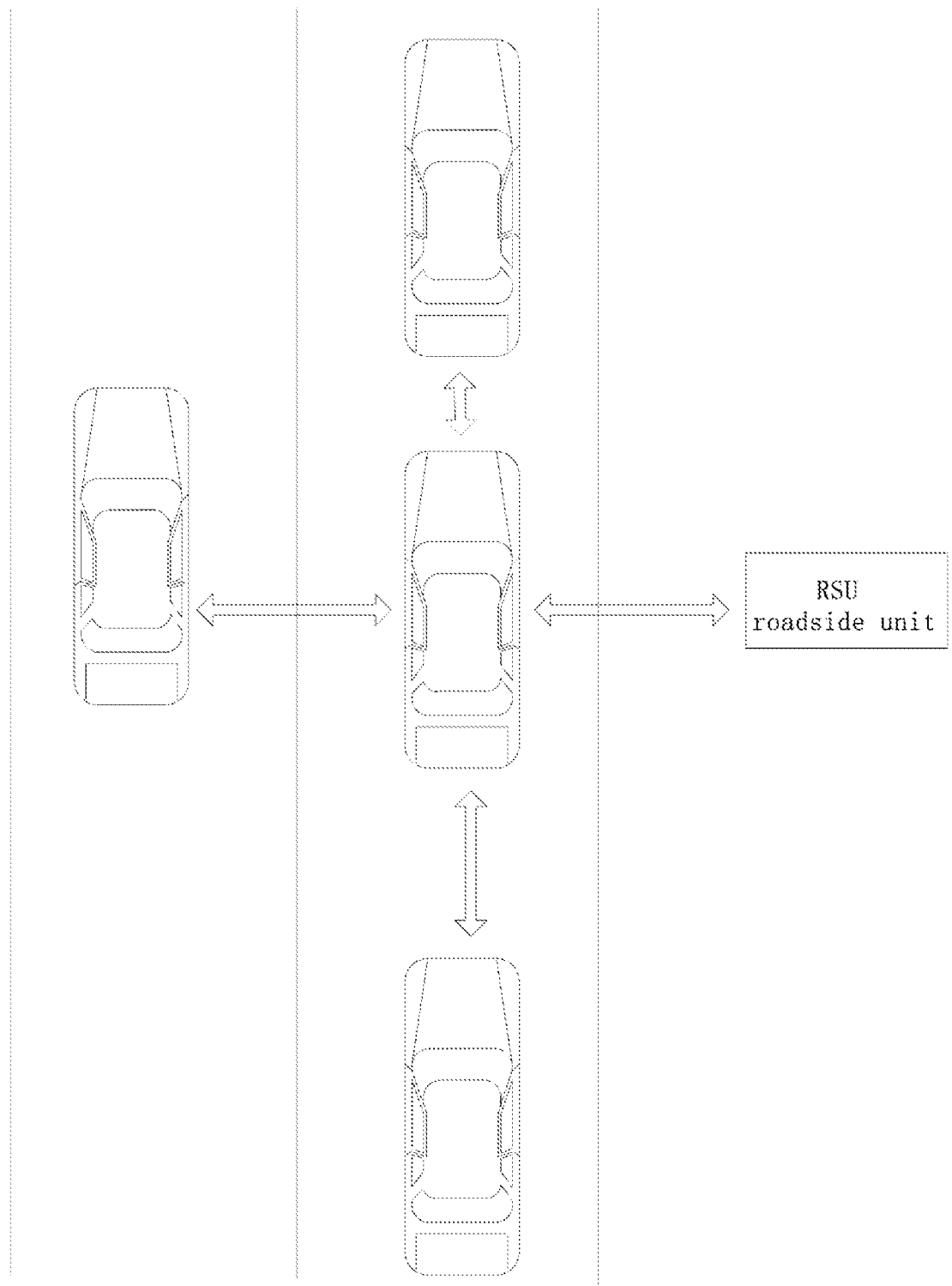
FIG. 6 is a schematic diagram of a V2X terminal device according to another embodiment of the present disclosure.
Figure 7:
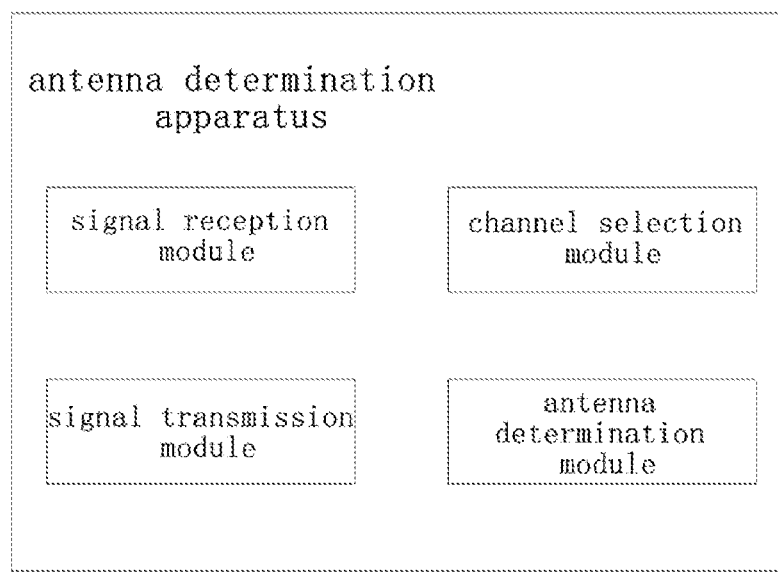
FIG. 7 is a module diagram of an antenna determination apparatus according to another embodiment of the present disclosure.

FIG. 6 is a schematic diagram of the V2X system terminal device according to another embodiment of the present disclosure.

Those having ordinary skills in the art should also know that after both the first terminal device and the second terminal device achieve high quality and low latency communication by utilizing the antenna determination method according to the above embodiments, and after the first terminal device and a third terminal device also achieve high quality and low latency communication by utilizing the antenna determination method according to the above embodiments, the second terminal device and the third terminal device can communicate with each other by means of the first terminal device. At this time, the first terminal device serves as a base station for resource allocation.

When the second terminal device and the third terminal device are far away from each other and cannot directly communicate with each other through the direct link, this indirect communication mode can solve this problem.

In this embodiment, the vehicle terminal device shown in the center of the figure has four antennas oriented forward, backward, left and right. Based on the antenna determination method according to the above embodiments, an antenna oriented to the left may be used when the vehicle terminal device communicates with a vehicle terminal device on the left. Similarly, an antenna oriented to the right may be used when the vehicle terminal device communicates with a roadside unit on the right. The above antennas can ensure the best communication quality and the minimum latency. When the vehicle terminal device realizes communication with the vehicle terminal device on the left and communication with the roadside unit on the right, the vehicle terminal device can be used as a base station to realize communication between the vehicle terminal device on the left and the roadside unit on the right.

In accordance with an aspect of the present disclosure, an embodiment provides an antenna determination apparatus. The apparatus includes: a signal reception module configured to acquire received signals of two antennas; a channel selection module configured to compare signal quality of the received signals with a first signal quality threshold respectively, and select a channel corresponding to the received signal with signal quality greater than the first signal quality threshold as a communication channel; and an antenna determination module configured to determine an antenna corresponding to the communication channel. The antenna switching device further includes a signal transmission module, which is configured to transmit signals through the antenna corresponding to the transmission channel.

In accordance with another aspect of the present disclosure, an embodiment provides a terminal device. The terminal device performs the antenna determination method described above.

In accordance with another aspect of the present disclosure, an embodiment provides an electronic device. The device includes: a processor, and a memory configured to store a computer program which, when executed by the processor, causes the processor to implement the method described above.

In accordance with another aspect of the present disclosure, an embodiment provides a computer-readable storage medium, storing computer executable instructions which, when executed by a processor, cause the processor to implement the method described above.

The embodiments of the present disclosure, on the premise of establishing communication connection with an opposite terminal device, by means of comparing the quality of the received signals of at least two antennas, selecting the channel corresponding to the signal with better signal quality as the communication channel, and switching to the antenna corresponding to the communication channel for subsequent signal transmission and reception, can effectively reduce the communication latency, improve the communication quality, and share obtained vehicle speed, direction, geographic location, route and other important information with other terminal devices in a timely and effective manner in the V2X direct link communication based on the mode of selecting resources by UE independently.

The device embodiments described above are only illustrative, in which the units described as separated components may be or may not be physically separated, that is, they may be located in one place or distributed across multiple network units. Some or all of the modules can be selected according to actual needs to achieve the purpose of the embodiments.

Those having ordinary skills in the art can understand that all or some of the steps in the method, systems, and functional modules in the device disclosed above may be implemented as software, firmware, hardware, and appropriate combinations thereof. In the hardware implementation, the division between functional modules/units mentioned in the above description does not necessarily correspond to the division of physical components. For example, a physical component may have multiple functions, or a function or step may be performed jointly by several physical components. Some or all of the physical components may be implemented as software executed by a processor, such as a central processor, a digital signal processor, or a microprocessor, or as hardware, or as an integrated circuit, such as an application specific integrated circuit. Such software may be distributed on a computer-readable medium, which may include a computer storage medium (or a non-temporary medium) and a communication medium (or a temporary medium). As is well known to those having ordinary skills in the art, the term computer storage medium includes volatile and nonvolatile, removable and non-removable media implemented in any method or technology for storing information, such as computer-readable instructions, data structures, program modules, or other data. A computer storage medium may include, but not limited to, a random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette, a magnetic tape, a magnetic disk storage or other magnetic storage device, or any other medium which can be used to store the desired information and which can be accessed by a computer. In addition, as is known to those having ordinary skills in the art, the communication medium typically includes computer-readable instructions, data structures, program modules, or other data in a modulated data signal such as a carrier wave or other transport mechanism, and may include any information passing medium. The terminal device may be all terminal devices in the vehicle network system, including vehicle terminal devices, roadside units, etc., or mobile phones, tablets, laptops, handheld computers, vehicle terminal device, wearable devices, super mobile personal computers, netbooks, personal digital assistants, CPE, UFI (wireless hotspot devices), and the like in non-vehicle network systems, which is not specifically limited in the implementations of the present disclosure.

The above describes some embodiments of the present disclosure, but the present disclosure is not limited thereto. Those having ordinary skills in the art can also make various equivalent deformations or substitutions without violating the scope of the present disclosure. These equivalent deformations or substitutions are included in the scope defined by the claims of the present disclosure.

What is claimed is:

1. An antenna determination method, which is applicable to a first terminal device comprising at least two antennas, the method comprising:
    acquiring received signals of two antennas respectively;
    comparing signal quality of the received signals of the two antennas with a first signal quality threshold respectively, and selecting a channel corresponding to the received signal with signal quality greater than the first signal quality threshold as a communication channel; and
    determining an antenna corresponding to the communication channel as an operating antenna of the first terminal device;
    wherein the received signals of the two antennas are received at an interval and transmitted from different antennas of a second terminal device.

2. The method of claim 1, wherein comparing signal quality of the received signals of the two antennas with a first signal quality threshold respectively, and selecting a channel corresponding to the received signal with signal quality greater than the first signal quality threshold as a communication channel, comprises:
    selecting a channel corresponding to the received signal with best signal quality as the communication channel.

3. The method of claim 1, wherein the signal quality has an evaluation parameter comprising at least one of:
- a reference signal receiving power,
- a signal to interference plus noise ratio,
- a received signal strength indication, or
- a reference signal receiving quality.

4. The method of claim 1, wherein the two antennas are directional antennas with different orientations.

5. An electronic device, comprising:
- a processor, and
- a memory storing a computer program which, when executed by the processor, causes the processor to perform an antenna determination method applicable to a first terminal device comprising at least two antennas, the method comprising:
  - acquiring received signals of two antennas respectively;
  - comparing signal quality of the received signals of the two antennas with a first signal quality threshold respectively, and selecting a channel corresponding to the received signal with signal quality greater than the first signal quality threshold as a communication channel; and
  - determining an antenna corresponding to the communication channel as an operating antenna of the first terminal device;
  - wherein the received signals of the two antennas are received at an interval and transmitted from different antennas of a second terminal device.

6. The electronic device of claim 5, wherein comparing signal quality of the received signals of the two antennas with a first signal quality threshold respectively, and selecting a channel corresponding to the received signal with signal quality greater than the first signal quality threshold as a communication channel, comprises:
- selecting a channel corresponding to the received signal with best signal quality as the communication channel.

7. The electronic device of claim 5, wherein the signal quality has an evaluation parameter comprising at least one of:
- a reference signal receiving power,
- a signal to interference plus noise ratio,
- a received signal strength indication, or a reference signal receiving quality.

8. The electronic device of claim 5, wherein the two antennas are directional antennas with different orientations.

9. A non-transitory computer-readable storage medium storing computer executable instructions which, when executed by the processor, cause the processor to perform an antenna determination method applicable to a first terminal device comprising at least two antennas, the method comprising:
- acquiring received signals of two antennas respectively;
- comparing signal quality of the received signals of the two antennas with a first signal quality threshold respectively, and selecting a channel corresponding to the received signal with signal quality greater than the first signal quality threshold as a communication channel; and
- determining an antenna corresponding to the communication channel as an operating antenna of the first terminal device;
- wherein the received signals of the two antennas are received at an interval and transmitted from different antennas of a second terminal device.

10. The non-transitory computer-readable storage medium of claim 9, wherein comparing signal quality of the received signals of the two antennas with a first signal quality threshold respectively, and selecting a channel corresponding to the received signal with signal quality greater than the first signal quality threshold as a communication channel, comprises:
- selecting a channel corresponding to the received signal with best signal quality as the communication channel.

11. The non-transitory computer-readable storage medium of claim 9, wherein the signal quality has an evaluation parameter comprising at least one of:
- a reference signal receiving power,
- a signal to interference plus noise ratio,
- a received signal strength indication, or
- a reference signal receiving quality.

12. The non-transitory computer-readable storage medium of claim 9, wherein the two antennas are directional antennas with different orientations.

* * * * *